United States Patent [19]

Clegg

[11] Patent Number: 4,577,938

[45] Date of Patent: Mar. 25, 1986

[54] CONICAL BEAM CONCENTRATOR

[76] Inventor: John E. Clegg, 2320 Keystone Dr., Orlando, Fla. 32806

[21] Appl. No.: 651,015

[22] Filed: Sep. 17, 1984

[51] Int. Cl.$^4$ .......................................... G02B 13/18
[52] U.S. Cl. ................................. 350/432; 126/440; 350/443
[58] Field of Search .................. 350/432, 443; 126/440

[56] References Cited

U.S. PATENT DOCUMENTS

| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

OTHER PUBLICATIONS

Rioux et al., "Linear, Annular, and Radial Focusing with Axicons and Applications to Laser Machining", Applied Optics, vol. 17, No. 10, 5/78, pp. 1532-1536.

Primary Examiner—John K. Corbin
Assistant Examiner—Rebecca D. Gass

[57] ABSTRACT

A conical beam concentrator comprising; (a) an upper component lens with a convex conical section (face) which receives a convergent conical incipient beam of diffused sunlight and transmits the beam through the lens to a convex conical section which refracts the beam inward, forming a convergent conical concentrated beam, (b) a lower component lens with a convex conical section which transmits the beam through the lens to a convex conical reflective section which reflects the beam downward to a concave conical section which refracts the beam a second time, forming a concentrated whole beam which is emitted parallel to the vertical optic axis of the concentrator.

1 Claim, 2 Drawing Figures

CONICAL BEAM CONCENTRATOR

BACKGROUND

The code designation of the concentrator is RLT-RT:C (R—refracting section of a lens, L—reflecting section of a lens, T—transmitting section of a lens, and C—concentrating lens).

Prior art includes the *Reflective Beam Concentrator*, U.S. Pat. No. 4,325,612, 4/20/82, by this inventor. This concentrator has a conical mirror which receives an annular incipient beam and reflects the beam inward to a conical lens, forming a convergent conical beam which is refracted and emitted as a whole concentrated beam.

DRAWINGS

DESCRIPTION

Figure 1:
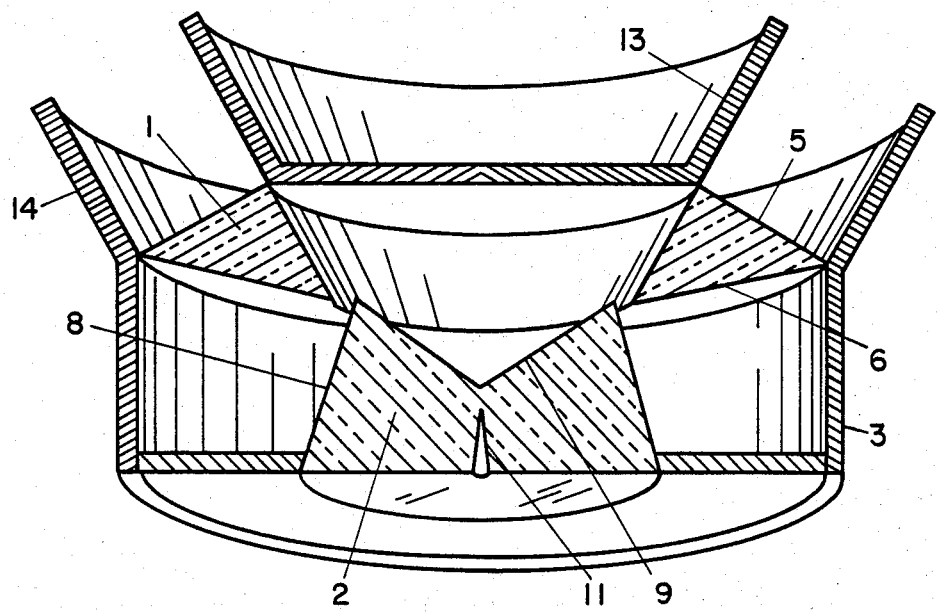
FIG. 1 is an elevation of the conical beam concentrator with the lenses shown in section.
Figure 2:
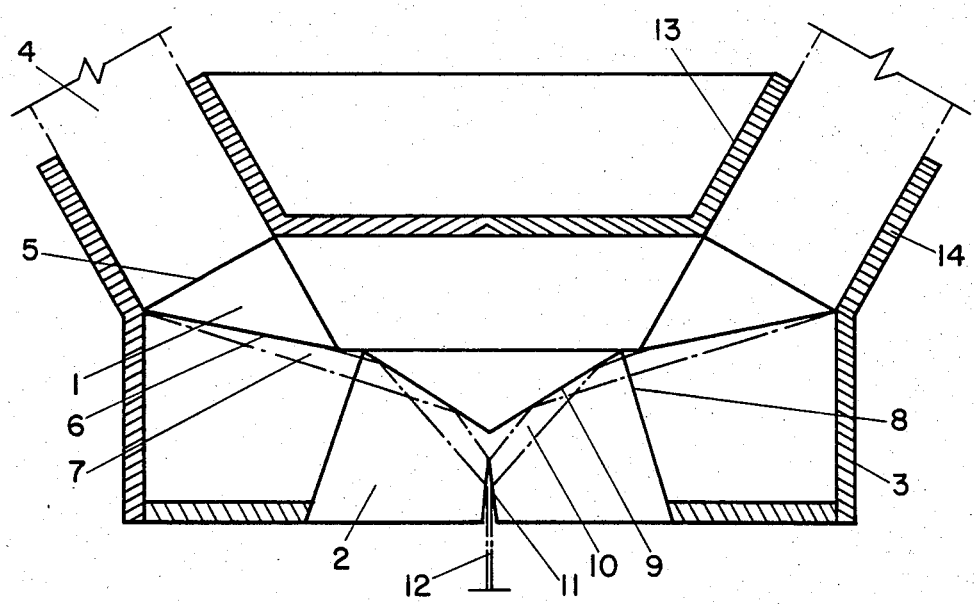
FIG. 2 is an elevation of the conical beam concentrator with a ray diagram.

FIGS. 1 and 2 show the conical beam concentrator with upper component lens RT 1 mounted above lower component lens RLT 2 inside casing 3. Convergent conical incipient beam 4 of diffused sunlight is received by convex conical section 5 and transmitted through the lens to convex conical section 6 which refracts and emits the beam, forming convergent conical concentrated beam 7.

Beam 7 which is emitted parallel to the vertical optic axis of the lenses is received and transmitted by convex conical section 8, reflected by convex conical reflective section 9, forming convergent conical beam 10 which is refracted by concave conical section 11 and emitted as a concentrated whole beam 12.

Upper hood 13 and lower hood 14 define the upper and lower sides of incipient beam 4 and intercept radiation from outside the beam.

I claim:

1. A conical beam concentrator comprising in general two component lenses which receive a convergent conical incipient beam of diffused sunlight and emit a concentrated whole beam parallel to the optic axis of the lenses, and comprising in particular;

an upper component lens RT (1) having a convex conical section (5) which receives and transmits a convergent conical incipient beam (4) of diffused sunlight, and having a convex conical section (6) which refracts and emits incipient beam (4), forming convergent conical concentrated beam (7), and a lower component lens RLT (2) having a convex conical section (8) which transmits concentrated beam (7), having a convex conical reflective section (9) which reflects concentrated beam (7), forming convergent conical beam (10), and having a concave conical section (11) which refracts and emits convergent conical beam (10), forming concentrated whole beam (12) which is emitted parallel to the vertical optic axis of the lenses.

* * * * *